(12) United States Patent
Uchida et al.

(10) Patent No.: US 9,261,746 B2
(45) Date of Patent: Feb. 16, 2016

(54) LIQUID CRYSTAL DISPLAY DEVICE AND MANUFACTURING METHOD OF LIQUID CRYSTAL DISPLAY DEVICE

(75) Inventors: Seiichi Uchida, Osaka (JP); Seiji Kaneko, Osaka (JP); Yasuyuki Ogawa, Osaka (JP); Kaoru Yamamoto, Osaka (JP); Kohhei Tanaka, Osaka (JP); Yutaka Takamaru, Osaka (JP); Shigeyasu Mori, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 79 days.

(21) Appl. No.: 14/234,450

(22) PCT Filed: Aug. 3, 2012

(86) PCT No.: PCT/JP2012/004959
§ 371 (c)(1),
(2), (4) Date: Jan. 23, 2014

(87) PCT Pub. No.: WO2013/021607
PCT Pub. Date: Feb. 14, 2013

(65) Prior Publication Data
US 2014/0176845 A1 Jun. 26, 2014

(30) Foreign Application Priority Data

Aug. 10, 2011 (JP) ................................. 2011-174511

(51) Int. Cl.
*G02F 1/136* (2006.01)
*G02F 1/1343* (2006.01)
(Continued)

(52) U.S. Cl.
CPC ........ *G02F 1/136213* (2013.01); *G02F 1/1333* (2013.01); *G02F 1/136227* (2013.01)

(58) Field of Classification Search
CPC ............ G02F 1/1368; G02F 1/136227; G02F 1/136286; G02F 1/136213; G02F 1/134336; G02F 1/133707; G02F 1/1393; H01L 27/1214; H01L 27/12
USPC ........................................ 349/43, 38, 39, 146
See application file for complete search history.

(56) References Cited

U.S. PATENT DOCUMENTS

2001/0046027 A1* 11/2001 Tai et al. ..................... 349/159
2002/0039814 A1* 4/2002 Jada et al. .................... 438/155

(Continued)

FOREIGN PATENT DOCUMENTS

| CN | 101128940 A | 2/2008 |
| CN | 102013228 A | 4/2011 |

(Continued)

OTHER PUBLICATIONS

Official Communication issued in International Patent Application No. PCT/JP2012/004959, mailed on Sep. 4, 2012.

*Primary Examiner* — Mike Qi
(74) *Attorney, Agent, or Firm* — Keating & Bennett, LLP

(57) ABSTRACT

In order to suppress crosstalk between a pixel electrode and a source line to reduce flicker, an LCD device includes: gate lines 102 and source lines 105 which are provided in a grid pattern; pixel electrodes 111 arranged in a matrix pattern so as to correspond to intersections of the gate lines and the source lines; a transparent auxiliary capacitor electrode 109; and switching elements 121 configured to apply an image signal voltage supplied from the source line 105 to the pixel electrode 111 according to a scanning signal applied from the gate line 102. The switching element 121 is formed by using an oxide semiconductor layer 104, and the transparent auxiliary capacitor electrode 109 is provided between the source line 105 and the pixel electrode 111.

11 Claims, 12 Drawing Sheets

(51) Int. Cl.
*G02F 1/1362* (2006.01)
*G02F 1/1333* (2006.01)

(56) References Cited

U.S. PATENT DOCUMENTS

2006/0284172 A1* 12/2006 Ishii .............................. 257/43
2007/0229748 A1* 10/2007 Fujita ........................... 349/141
2008/0136990 A1* 6/2008 Kimura ........................... 349/46
2008/0305575 A1 12/2008 Ishii
2011/0057918 A1 3/2011 Kimura et al.
2011/0109351 A1* 5/2011 Yamazaki et al. ............. 327/109
2014/0362323 A1* 12/2014 Nakano et al. .................. 349/46

FOREIGN PATENT DOCUMENTS

| JP | 2004-020687 A | 1/2004 |
| JP | 2010-160308 A | 7/2010 |
| JP | 2010-230744 A | 10/2010 |

* cited by examiner

5 Hz DRIVE

120 Hz DRIVE

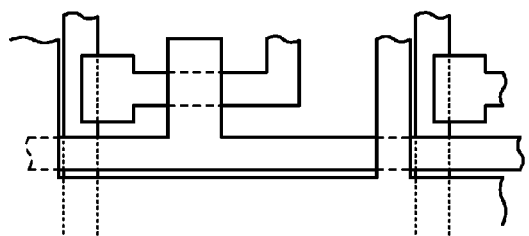
FIG.20
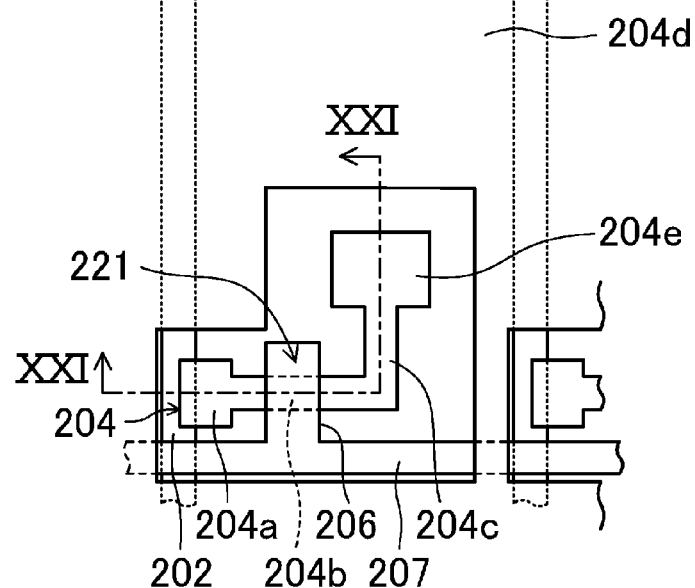
FIG.21
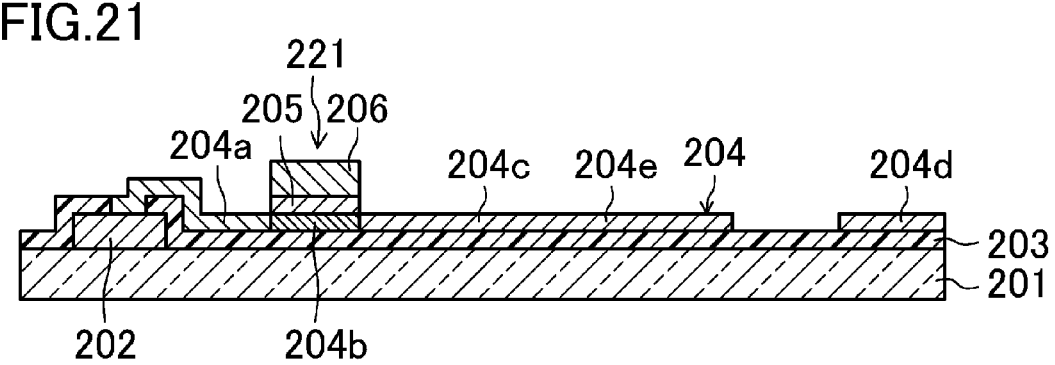

LIQUID CRYSTAL DISPLAY DEVICE AND MANUFACTURING METHOD OF LIQUID CRYSTAL DISPLAY DEVICE

TECHNICAL FIELD

The present invention relates to active matrix liquid crystal display (LCD) devices, and more particularly to LCD devices including an auxiliary capacitor electrode.

BACKGROUND ART

In active matrix LCD devices, it is desirable to increase an aperture ratio in order to improve luminance and contrast. In a known technique of increasing the aperture ratio, an edge of a pixel electrode is made to overlap a source line configured to apply an image signal voltage, so that an effective pixel region extends as closest to the source line as possible.

If the edge of the pixel electrode is made to overlap the source line as described above, the potential of the pixel electrode and thus the luminance fluctuate due to crosstalk, and flicker tends to occur. As a solution to this problem, a technique is known in which an auxiliary capacitor electrode is provided between the pixel electrode and the source line in the overlapping region thereof in order to suppress crosstalk and thus reduce flicker (see, e.g., Patent Document 1).

CITATION LIST

Patent Document

PATENT DOCUMENT 1: Japanese Unexamined Patent Publication No. 2004-20687

SUMMARY OF THE INVENTION

Technical Problem

One way to reliably suppress crosstalk between the pixel electrode and the source line is to form the auxiliary capacitor electrode in a sufficiently large area including not only the overlapping portion of the pixel electrode and the source line but also a region around the overlapping portion.

However, forming the auxiliary capacitor electrode in a large area increases auxiliary capacitance. This makes it difficult to store a sufficient amount of charge in the pixel electrode when an image signal voltage is applied to the pixel electrode via the source line.

The area where the auxiliary capacitor electrode can be formed is therefore limited, and it is actually difficult to provide such an auxiliary capacitor electrode as described in Patent Document 1 in a sufficiently large area to reliably reduce crosstalk and flicker.

The present invention was developed in view of the above problems, and it is an object of the present invention to reliably suppress crosstalk between a pixel electrode and a source line to reduce flicker.

Solution to the Problem

According to a first invention, an LCD device includes: gate lines and source lines which are provided in a grid pattern; pixel electrodes arranged in a matrix pattern so as to correspond to intersections of the gate lines and the source lines; a transparent auxiliary capacitor electrode that forms auxiliary capacitance between the transparent auxiliary capacitor electrode itself and the pixel electrode; and switching elements configured to apply an image signal voltage supplied from the source line to the pixel electrode according to a scanning signal applied from the gate line, wherein the switching element is comprised of oxide semiconductor, and the transparent auxiliary capacitor electrode is provided between the source line and the pixel electrode.

With this configuration, the transparent auxiliary capacitor electrode serves as a transparent shield electrode as it is provided between the source line and the pixel electrode. Crosstalk can thus be suppressed, and flicker can be reduced. In this case, the switching element has great driving capability as it is comprised of the oxide semiconductor. This makes it easy to store a sufficient amount of charge in the pixel electrode, increasing design flexibility of the shape and size of the transparent auxiliary capacitor electrode. A great shielding effect can therefore be easily obtained by forming the transparent auxiliary capacitor electrode in a large area, etc. This can significantly and reliably reduce parasitic capacitance, and can thus reliably suppress crosstalk and reduce flicker.

According to a second invention, in the LCD of the first invention, the transparent auxiliary capacitor electrode is formed over an entire area of each pixel region except a region where the switching element is provided and a region where the switching element is connected to the pixel electrode.

According to a third invention, in the LCD device of the first or second invention, the transparent auxiliary capacitor electrode is continuously formed over the pixel regions adjoining each other in vertical and horizontal directions.

With these configurations, for example, the source line can be easily sufficiently covered by the transparent auxiliary capacitor electrode. Thus, parasitic capacitance can be reliably reduced as described above, and crosstalk can be reliably suppressed, facilitating significant and reliable reduction in flicker. Since the transparent auxiliary capacitor electrode is continuously formed over the pixel regions adjoining each other in the vertical and horizontal directions, wiring resistance of the transparent auxiliary capacitor electrode can be reduced, whereby a load on driving of a panel can be reduced.

According to a fourth invention, in the LCD device of any one of the first to third inventions, the transparent auxiliary capacitor electrode is comprised of oxide semiconductor having lowered resistance.

According to a fifth invention, in the LCD device of the fourth invention, the transparent auxiliary capacitor electrode is formed in a same layer as the oxide semiconductor forming the switching element.

With these configurations, an oxide semiconductor layer that is formed to form the switching element can also be used as the transparent auxiliary capacitor electrode. This eliminates the need to separately form a conductor layer, facilitating simplification of the configuration and the manufacturing process.

According to a sixth invention, in the LCD device of the fifth invention, the switching element further has a gate insulating film and a gate electrode, and the oxide semiconductor, the gate insulating film, and the gate electrode which form the switching element are sequentially stacked on a substrate.

According to a seventh invention, in the LCD device of the sixth invention, the oxide semiconductor forming the transparent auxiliary capacitor electrode is formed by lowering resistance of a region that is not masked by the gate electrode of the switching element.

With these configurations, the number of manufacturing steps and the number of masks can be reduced, and accuracy can be improved to facilitate reduction in variation in characteristics, etc.

According to an eighth invention, in the LCD device of any one of the first to seventh inventions, a plurality of slits that are parallel to each other are formed in the pixel electrode.

With this configuration, an LCD device having a display mode with excellent viewing angle characteristics such as an in plane switching (IPS) mode or an advanced fringe field switching (AFFS) mode, etc. can be easily produced.

According to a ninth invention, in the LCD device of any one of the first to eighth inventions, the pixel electrode is provided so that its edge overlaps the source line.

Even if the pixel electrode thus overlaps the source line, parasitic capacitance is reliably reduced by the transparent auxiliary capacitor electrode. This can suppress crosstalk and can reduce flicker.

According to a tenth invention, a manufacturing method of an LCD device including gate lines and source lines which are provided in a grid pattern, pixel electrodes arranged in a matrix pattern so as to correspond to intersections of the gate lines and the source lines, an auxiliary capacitor electrode that forms auxiliary capacitance between the auxiliary capacitor electrode itself and the pixel electrode, and switching elements configured to apply an image signal voltage supplied from the source line to the pixel electrode according to a scanning signal applied from the gate line, the switching element being comprised of oxide semiconductor, and the auxiliary capacitor electrode being provided between the source line and the pixel electrode and comprised of oxide semiconductor having lowered resistance, includes the steps of: forming a conductor layer on a substrate and patterning the conductor layer into the source lines; forming an oxide semiconductor layer over the source line and patterning the oxide semiconductor layer into regions serving as a source electrode, a drain electrode, and a channel region of the switching element and a region serving as the auxiliary capacitor electrode; sequentially forming an insulating film layer and a conductor layer on the oxide semiconductor layer and patterning the insulating film layer and the conductor layer into a gate insulating film, the gate line, and a gate electrode; lowering resistance of the oxide semiconductor layer by using the gate electrode as a mask to form the source electrode and the drain electrode of the switching element and the auxiliary capacitor electrode; and forming a conductor layer over the drain electrode of the switching element and the auxiliary capacitor electrode and patterning the conductor layer into the pixel electrode.

With this configuration, parasitic capacitance is significantly and reliably reduced as described above. This can reliably suppress crosstalk and can reduce flicker. Moreover, the oxide semiconductor layer that is formed to form the switching element can also be used as the transparent auxiliary capacitor electrode. This eliminates the need to separately form a conductor layer, facilitating simplification of the configuration and the manufacturing process. The resistance of the oxide semiconductor layer is lowered by using the gate electrode as a mask to form the source electrode and the drain electrode of the switching element and the auxiliary capacitor electrode. This can reduce the number of manufacturing steps and the number of masks, and can improve accuracy to facilitate reduction in variation in characteristics, etc.

Advantages of the Invention

According to the present invention, crosstalk between a pixel electrode and a source line can be reliably suppressed to reduce flicker.

BRIEF DESCRIPTION OF THE DRAWINGS

FIG. 20 is a plan view showing a third manufacturing step of the LCD device of the fourth embodiment.
FIG. 21 is a sectional view taken along line XXI-XXI in FIG. 20.

DESCRIPTION OF EMBODIMENTS

Figure 1:
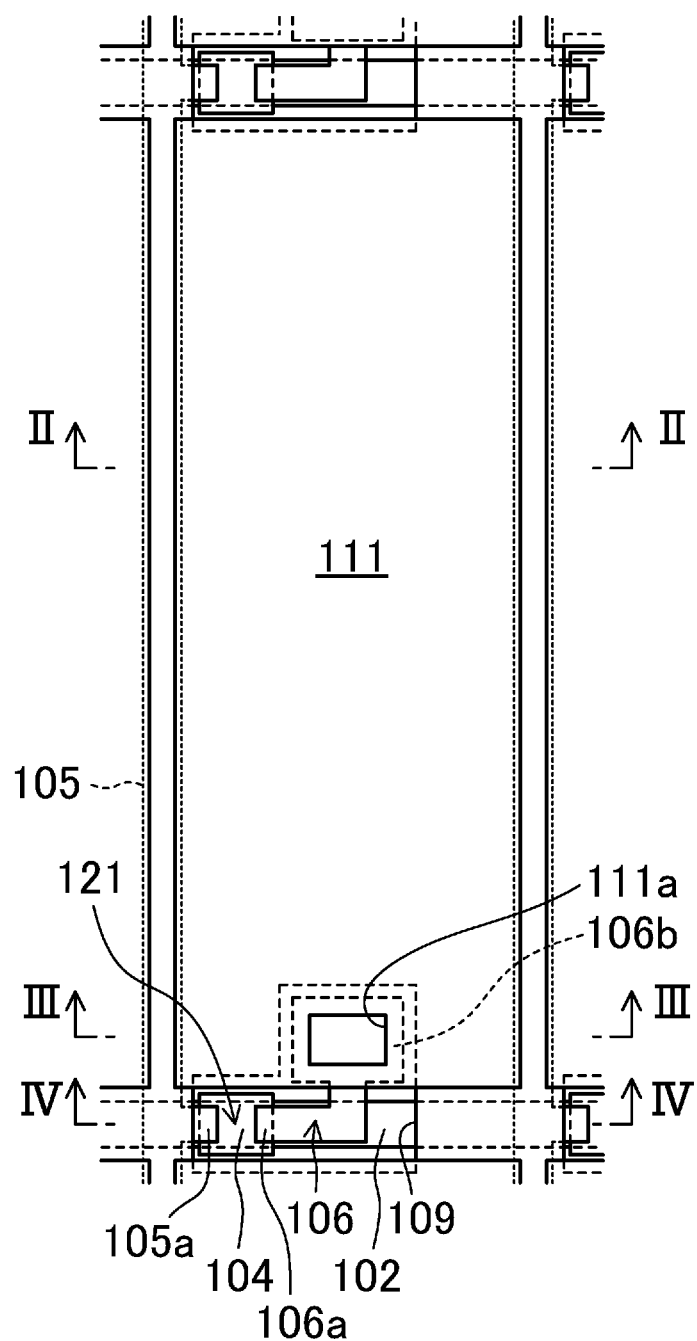
FIG. 1 is a plan view of an array substrate of an LCD device of a first embodiment.
Figure 2:
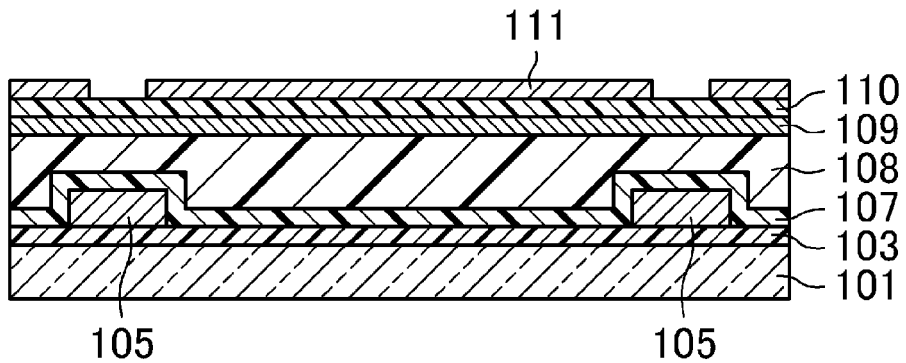
FIG. 2 is a sectional view taken along line II-II in FIG. 1.
Figure 3:
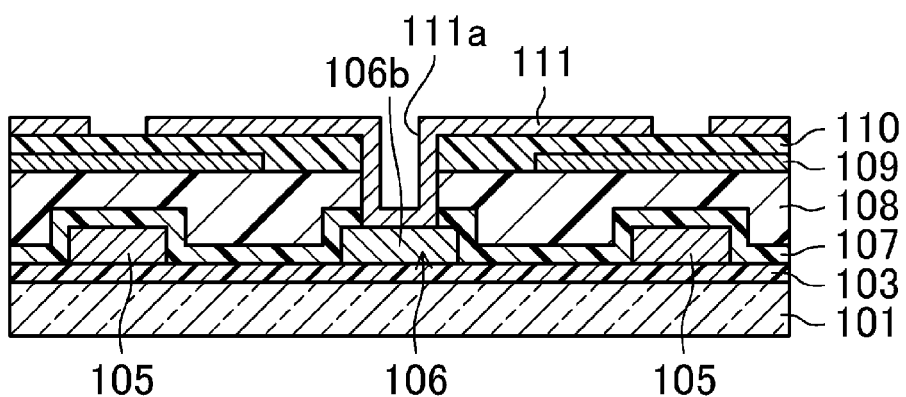
FIG. 3 is a sectional view taken along line III-III in FIG. 1.
Figure 4:
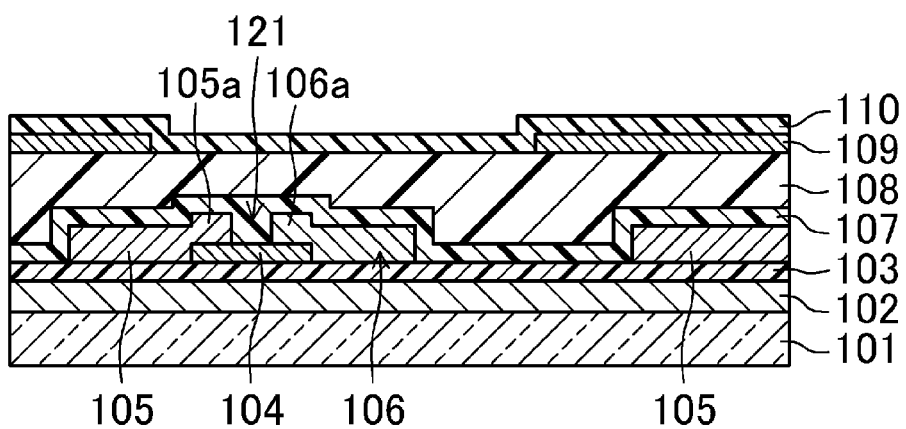
FIG. 4 is a sectional view taken along line IV-IV in FIG. 1.

Embodiments of the present invention will be described in detail with reference to the accompanying drawings. In each of the following embodiments, components having functions similar to those of the other embodiments are denoted with the same reference characters, and description thereof is omitted.

First Embodiment

Configuration of LCD Device

As shown in, e.g., FIGS. 1 to 4, an array substrate that together with a counter substrate forms an LCD device with a liquid crystal material enclosed therebetween includes: a transparent substrate 101; a plurality of gate lines 102 provided on the transparent substrate 101 so as to extend parallel to each other; a gate insulating film 103 provided so as to cover the gate lines 102; a plurality of source lines 105 provided on the gate insulating film 103 so as to extend parallel to each other in a direction perpendicular to the gate lines 102; oxide semiconductor layers 104 provided in an island shape on the gate insulating film 103 so as to correspond to each intersection of the gate line 102 and the source line 105, namely each sub-pixel, and each provided so as to overlap a part of a corresponding one of the gate lines 102; drain lines 106 each provided so that its one end overlaps a part of a corresponding one of the oxide semiconductor layers 104; an interlayer insulating film 107 and a planarizing film 108 which are provided so as to cover the oxide semiconductor layers 104, the source lines 105, and the drain lines 106; a transparent auxiliary capacitor electrode 109 provided on the planarizing film 108; a capacitor insulating film 110 provided so as to cover the transparent auxiliary capacitor electrode 109; a plurality of pixel electrodes 111 arranged in a matrix pattern on the capacitor insulating film 110 and each connected to a corresponding one of the drain lines 106; and an alignment film (not shown) provided so as to cover the pixel electrodes 111.

Insulating layers are not shown in FIG. 1 for convenience (the same applies to the following description).

Each switching element 121 (TFT: thin film transistor) is formed by a part of the gate line 102 which serves as a gate electrode, the gate insulating film 103, the oxide semiconductor layer 104, a source electrode 105a, and a drain electrode 106a. The oxide semiconductor layer 104 is comprised of, e.g., IGZO that mainly contains indium, gallium, zinc, and oxygen. Each source line 105 protrudes laterally at each sub-pixel so that the protruding part of the source line 105 overlaps the oxide semiconductor layer 104, and the source electrode 105a is formed by this protruding part of the source line 105. Each drain line 106 has its one end portion overlapping the oxide semiconductor layer 104, and the drain electrode 106a is formed by this end portion of the drain line 106. A connection portion 106b of the other end portion of the drain line 106 is connected to a connection portion 111a of the pixel electrode 111 via a contact hole formed in the interlayer insulating film 107, the planarizing film 108, and the capacitor insulating film 110.

The transparent auxiliary capacitor electrode 109 is formed over the entire area of each pixel region except the region where the switching element 121 is provided and the joint region between the connection portion 106b of the drain line 106 and the connection portion 111a of the pixel electrode 111. Namely, the transparent auxiliary capacitor electrode 109 is continuously formed over the pixel regions adjoining each other in the vertical and horizontal directions. This transparent auxiliary capacitor electrode 109 faces each pixel electrode 111 with the capacitor insulating film 110 interposed therebetween, thereby forming an auxiliary capacitor at each sub-pixel. This transparent auxiliary capacitor electrode 109 is provided between the source line 105 and the pixel electrode 111, and thus serves as a transparent shield electrode.

The LCD device is formed by bonding such an array substrate as described above and the counter substrate in which, e.g., a black matrix in a grid pattern, a color filter layer, and a counter electrode are formed on a transparent substrate, with a spacer interposed therebetween, and enclosing a nematic liquid crystal material having electrooptical characteristics, etc. between the array substrate and the counter substrate.

The LCD device formed as described above uses the switching element 121 having the oxide semiconductor layer 104 comprised of IGZO etc. As shown in, e.g., FIG. 5, this switching element 121 has greater driving capability than switching elements using amorphous silicon. The use of such characteristics makes it easy to store a sufficient amount of charge in the pixel electrode 111, increasing design flexibility of the shape and size of the transparent auxiliary capacitor electrode 109. This allows the transparent auxiliary capacitor electrode 109 to be formed over the entire area of each pixel region except the region where the switching element 121 is provided and the joint region between the connection portion 106b of the drain line 106 and the connection portion 111a of the pixel electrode 111 as described above, and a great shielding effect can be easily obtained.

Figure 6:
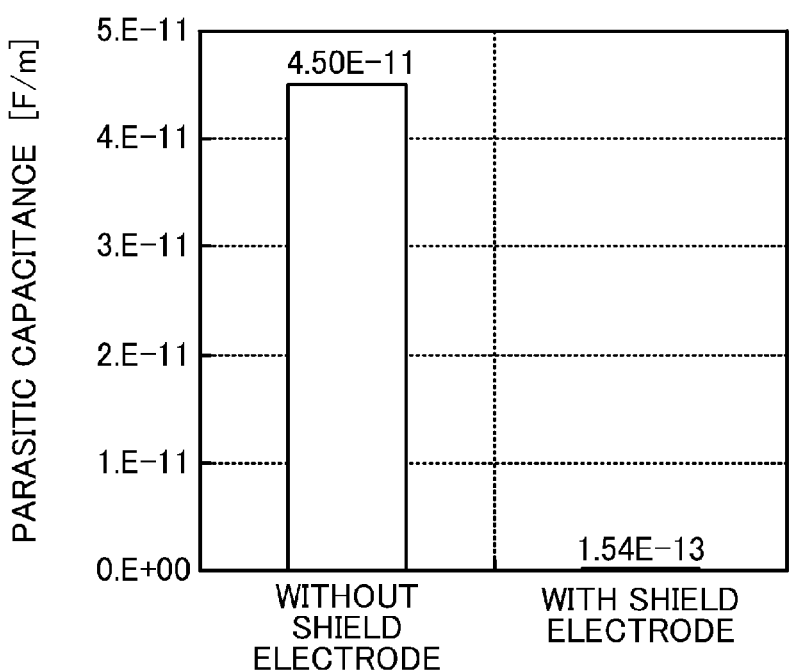
FIG. 6 is a graph showing the difference in parasitic capacitance according to whether there is a shield electrode or not.

Accordingly, parasitic capacitance between the pixel electrode 111 and the source line 105 can be significantly and reliably reduced (e.g., by at least two orders of magnitude as compared to the case where there is no shielding effect) as shown in, e.g., FIG. 6. This can reliably suppress crosstalk between the pixel electrode 111 and the source line 105 and can reduce flicker.

Moreover, providing the transparent auxiliary capacitor electrode 109 in a large area increases auxiliary capacitance between the transparent auxiliary capacitor electrode 109 itself and the pixel electrode 111. This reduces the influence of the parasitic capacitance between the pixel electrode 111 and the source line 105, and thus further reduces flicker.

Figure 5:
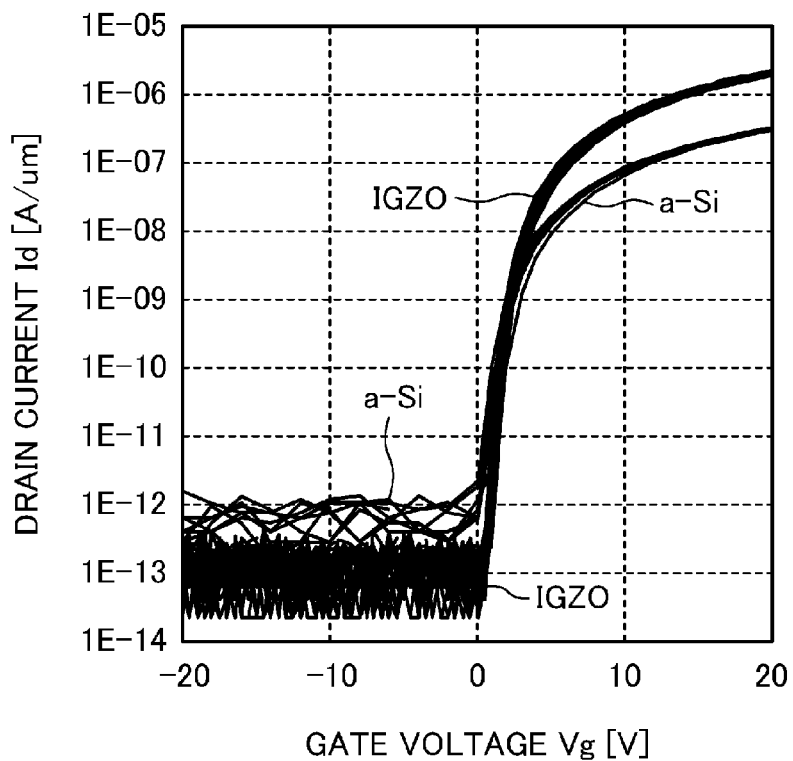
FIG. 5 is a graph showing characteristics of a switching element of the first embodiment.

Furthermore, such a switching element 121 as described above has a small off leakage current as also shown in FIG. 5 (e.g., $\frac{1}{10}$ or less as compared to switching elements using amorphous silicon). Accordingly, leakage of charge stored in the pixel electrode 111 is significantly reduced. In addition to the increase in auxiliary capacitance, this reduction in leakage of charge suppresses flicker.

(Manufacturing Method of LCD Device)

A manufacturing method of the LCD device described above will be described.

First, a manufacturing method of the counter substrate will be described.

(1) A light-shielding film (e.g., Ti, 200 nm) is formed on a glass substrate, and is patterned into a desired shape by a photolithography process.

(2) Next, an insulating layer (e.g., $SiO_2$, 200 nm) is formed.

(3) Then, a transparent electrode (e.g., ITO, 100 nm) is formed by a sputtering method, whereby the counter substrate is completed.

Next, a manufacturing method of the array substrate will be described.

(1) A conductive film (e.g., a stacked structure of Ti (100 nm)/aluminum (200 nm)/Ti (30 nm)) is formed on the transparent substrate 101 such as a glass substrate, and is patterned into a desired shape by a photolithography process (this will serve as the gate lines 102).

(2) Next, an insulating film (e.g., a stacked structure of $SiO_2$ (50 nm)/SiNx (325 nm)) is formed (this will serve as the gate insulating film 103).

(3) Then, an IGZO film (e.g., 50 nm) is formed, and is patterned into a desired shape by a photolithography process (the oxide semiconductor layers 104).

(4) Then, a conductive film (e.g., a stacked structure of Ti (100 nm)/Al (200 nm)/Ti (30 nm)) is formed, and is patterned into a desired shape by a photolithography process (this will serve as the source lines 105 and the drain lines 106).

(5) Then, an insulating film (e.g., $SiO_2$ (300 nm)) is formed, and a photosensitive organic film is applied to planarize the surface (the interlayer insulation film 107, the planarizing film 108), and contact holes are formed at desired positions by a photolithography process.

(6) Then, a transparent electrode (e.g., ITO or IZO, 100 nm) is formed by a sputtering method, and is patterned into a desired shape by a photolithography process (this will serve as the transparent auxiliary capacitor electrode 109).

(7) Then, an insulating layer (e.g., $SiO_2$ (400 nm)) is formed (the capacitor insulation film 110), and a transparent electrode (e.g., ITO or IZO, 100 nm) is formed by a sputtering method, and is patterned into a desired shape by a photolithography process (this will serve as the pixel electrodes 111).

(8) Then, a photo spacer, for example, is placed on the array substrate.

The counter substrate and the array substrate manufactured as described above are bonded together, a liquid crystal material is injected therebetween, and a substrate is cut into individual pieces. The LCD device (liquid crystal panel) is thus completed.

(Others)

Driving of the LCD device will be described. Since the LCD device uses the switching element 121 formed by using the oxide semiconductor layer 104 and having great driving capability as described above, charge storage time of the pixel electrode 111 can be easily reduced, and high speed writing can be easily achieved. Moreover, the small off leakage current of the switching element 121 can suppress flicker caused by leakage of charge stored in the pixel electrode 111, even if the LCD device is driven at low frequencies with idle periods as shown in, e.g., FIG. 7.

Figure 7:
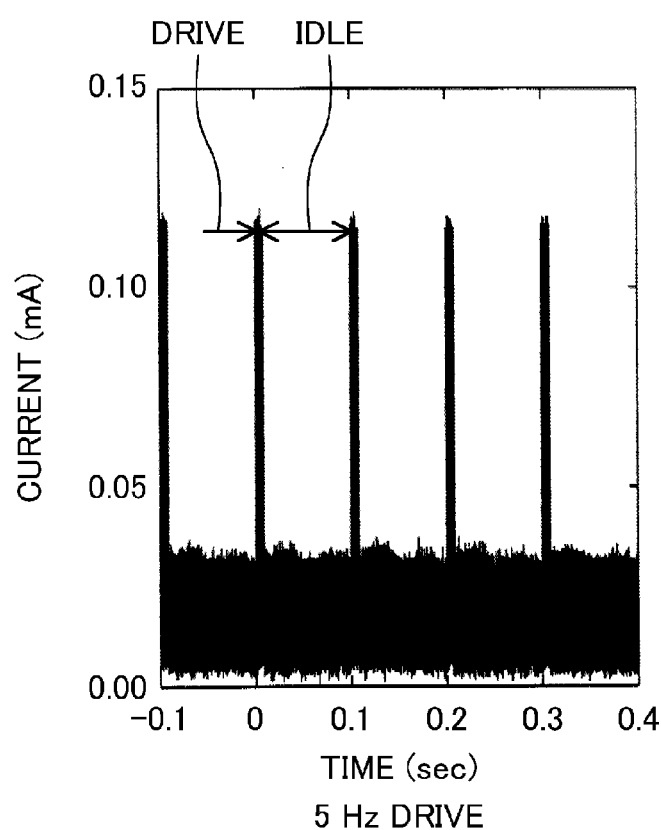
FIG. 7 is a graph showing a current flowing in a source driver upon driving for high speed writing.
Figure 8:
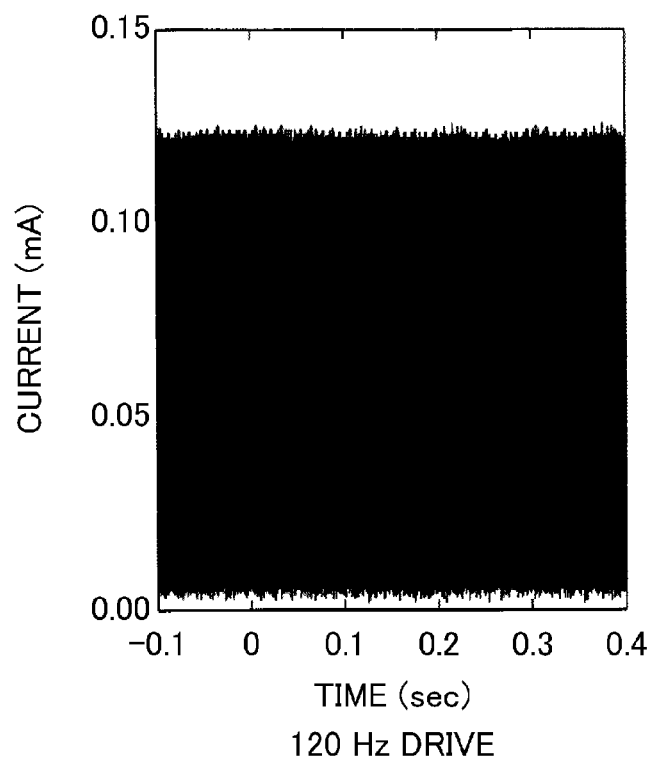
FIG. 8 is a graph showing a current flowing in the source driver upon driving for normal writing.

Such high speed writing and low frequency driving can achieve significant reduction in power consumption. Specifically, for example, an analog current that flows in a source driver is always large in the case where the LCD device is driven at 120 Hz as shown in FIG. 8. However, in the case where the LCD device is driven at low frequencies (5 Hz) as shown in FIG. 7, this analog current is significantly reduced because one horizontal scanning (1H) period includes drive periods and idle periods of the driver.

Second Embodiment

Figure 9:
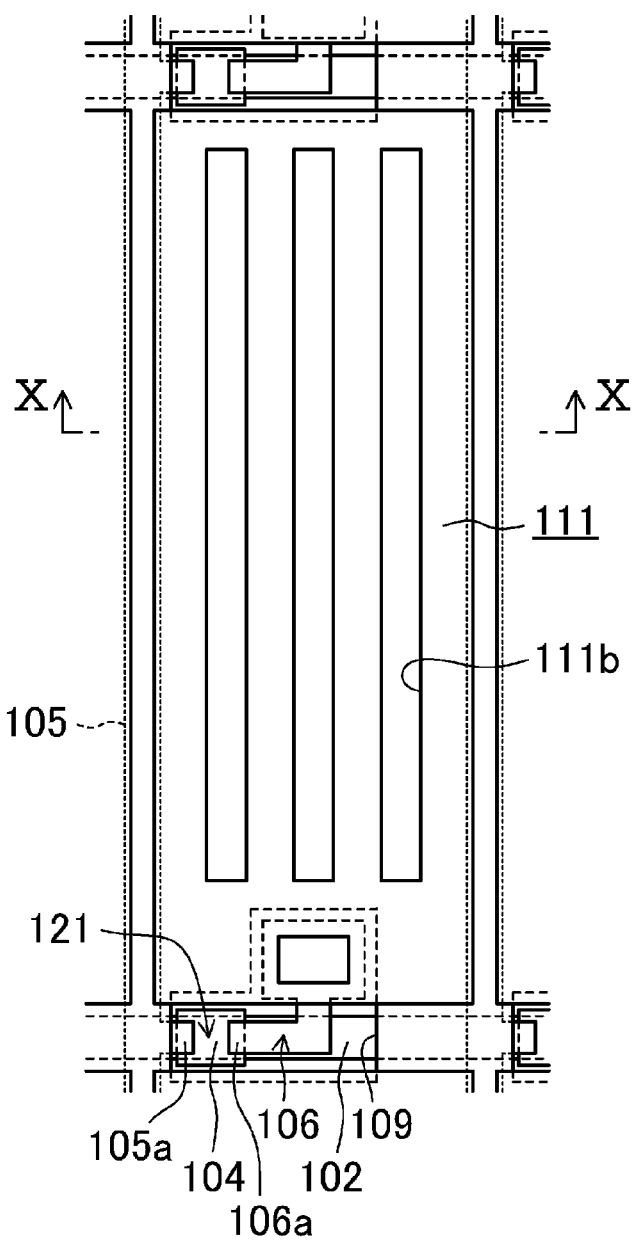
FIG. 9 is a plan view of an array substrate of an LCD device of a second embodiment.
Figure 10:
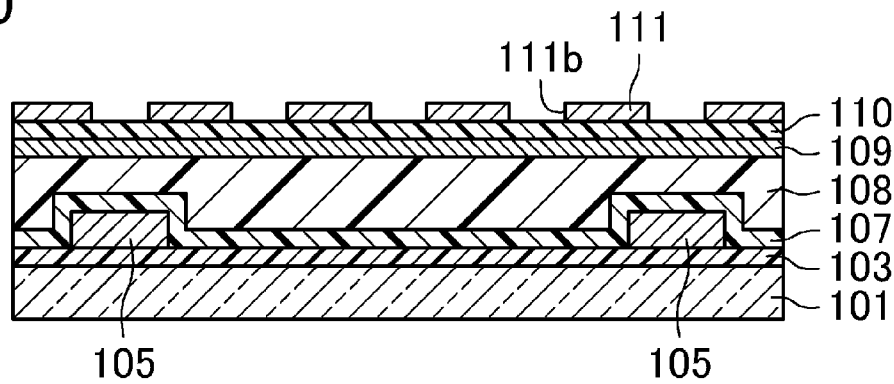
FIG. 10 is a sectional view taken along line X-X in FIG. 9.

The pixel electrode 111 has a continuous shape in the pixel region in the first embodiment (FIG. 1). However, the pixel electrode 111 is not limited to this, and may have, e.g., a shape having an opening such as a plurality of slits 111b as shown in FIGS. 9 and 10. Specifically, even if an LCD device having a display mode with excellent viewing angle characteristics, such as an in plane switching (IPS) mode or an advanced fringe field switching (AFFS) mode, is produced by using such a pixel electrode 111, parasitic capacitance between the pixel electrode 111 and the source line 105 is similarly reduced, and crosstalk between the pixel electrode 111 and the source line 105 is reliably suppressed, whereby flicker can be reduced.

Third Embodiment

Figure 11:
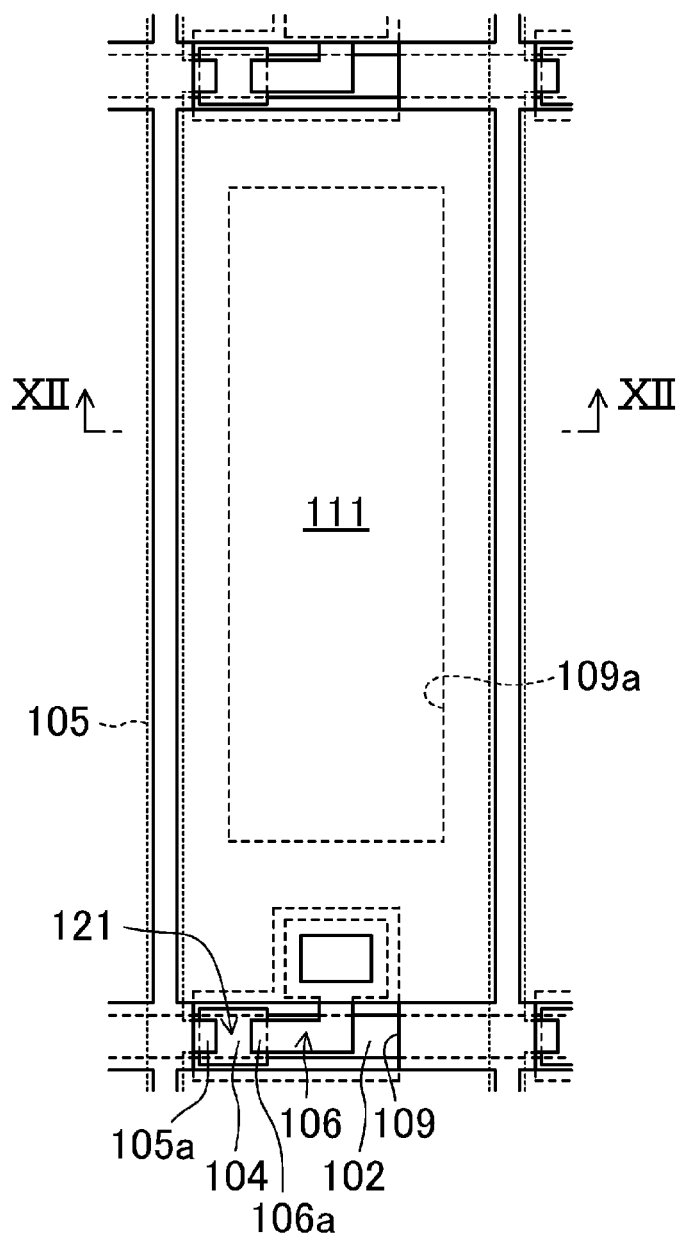
FIG. 11 is a plan view of an array substrate of an LCD device of a third embodiment.
Figure 12:
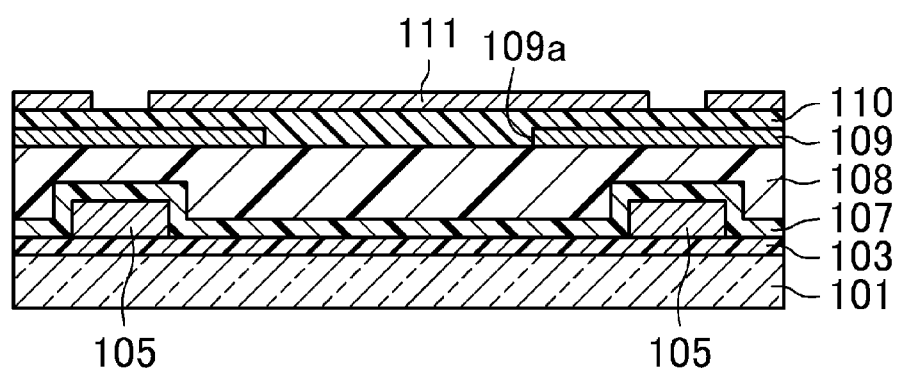
FIG. 12 is a sectional view taken along line XII-XII in FIG. 11.

The transparent auxiliary capacitor electrode 109 need only be provided in a sufficiently large area including the region where the source line 105 overlaps the pixel electrode 111 and the vicinity thereof. For example, the transparent auxiliary capacitor electrode 109 may have an opening 109a with a rectangular shape as shown in FIGS. 11 and 12 or other shapes so that auxiliary capacitance does not become too large. That is, even if the opening 109a is formed at a position located sufficiently away from the source line 105, crosstalk between the pixel electrode 111 and the source line 105 can be reliably suppressed and flicker can be reduced as long as a sufficient shielding effect of the transparent auxiliary capacitor electrode 109 is obtained near the source line 105.

Fourth Embodiment

An example of the LCD device will be described in which the transparent auxiliary capacitor electrode is formed by an oxide semiconductor layer having lowered resistance.

In this LCD device, the switching element and the transparent auxiliary capacitor electrode are formed in the same layer by using the oxide semiconductor layer. That is, the oxide semiconductor layer is formed on the source line, and then a part of the oxide semiconductor layer is lowered in resistance to form the source and drain regions of the switching element and the transparent auxiliary capacitor electrode as a transparent shield electrode. The channel region of the switching element is formed by a part of the oxide semiconductor layer which has not been lowered in resistance. This will be specifically described below.

(Configuration of LCD Device)

Figure 13:
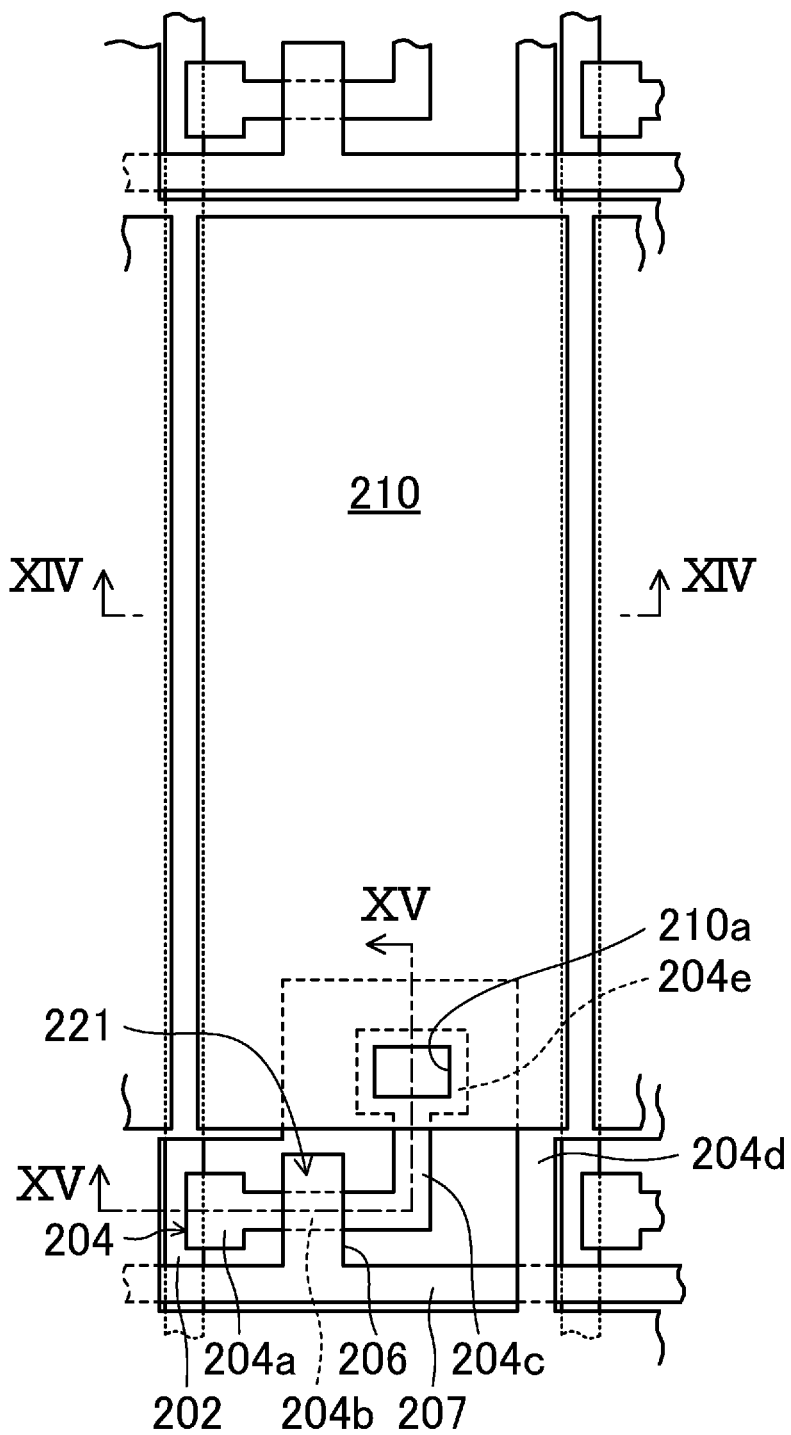
FIG. 13 is a plan view of an array substrate of an LCD device of a fourth embodiment.
Figure 14:
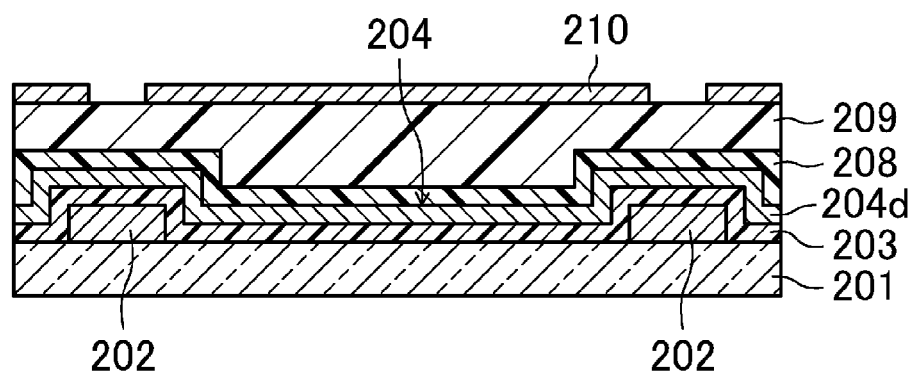
FIG. 14 is a sectional view taken along line XIV-XIV in FIG. 13.
Figure 15:
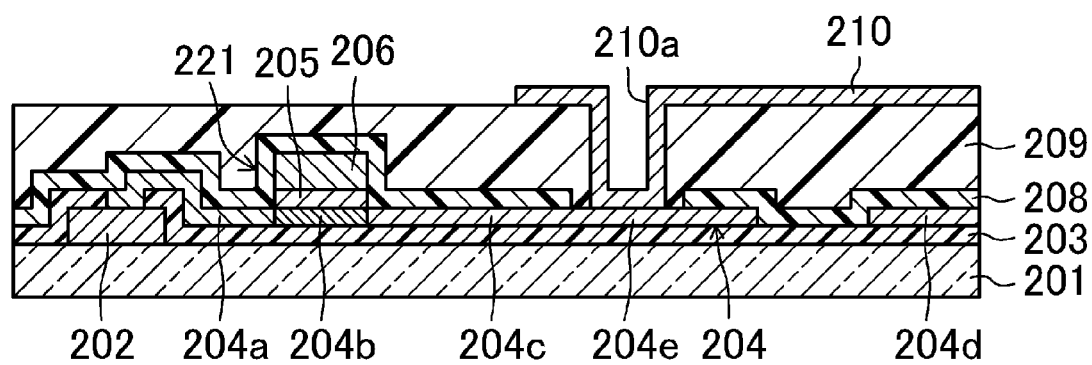
FIG. 15 is a sectional view taken along line XV-XV in FIG. 13.

As shown in, e.g., FIGS. 13 to 15, an array substrate of the LCD device of the fourth embodiment includes: a transparent substrate 201; a plurality of source lines 202 provided on the transparent substrate 201 so as to extend parallel to each other; an insulating film 203 provided so as to cover the source lines 202; oxide semiconductor layers 204 provided on the insulating film 203 and each serving as a source region 204a, a channel region 204b, a drain region 204c, a transparent auxiliary capacitor electrode 204d, and a connection portion 204e; a gate insulating film 205 provided on the channel region 204b of the oxide semiconductor layer 204; a plurality of gate lines 207 provided so as to extend parallel to each other in a direction perpendicular to the source lines 202; gate electrodes 206 each formed by a protruding part of a corresponding one of the gate lines 207 and provided so as to cover the gate insulating film 205; an interlayer insulating film 208 and a planarizing film 209 which are provided so as to cover the oxide semiconductor layers 204, the gate electrodes 206, and the gate lines 207; a plurality of pixel electrodes 210 arranged in a matrix pattern on the planarizing film 209 and each connected to the connection portion 204e continuous with the drain region 204c of a corresponding one of the oxide semiconductor layers 204; and an alignment film (not shown) provided so as to cover the pixel electrodes 210.

Each switching element 221 (TFT: thin film transistor) is formed by the gate electrode 206, the gate insulating film 205, and the source region 204a, the channel region 204b, and the drain region 204c of the oxide semiconductor layer 204. The oxide semiconductor layer 204 is comprised of, e.g., IGZO that mainly contains indium, gallium, zinc, and oxygen. A part of the oxide semiconductor layer 204 is used as it is as the channel region 204b of the switching element 221, and the oxide semiconductor layer 204 is partially lowered in resistance as described below to form the source region 204a, the drain region 204c, and the transparent auxiliary capacitor electrode 204d.

As in the first embodiment, the transparent auxiliary capacitor electrode 204d is formed over the entire area of each pixel region except the region where the switching element 221 is provided and the joint region between the connection portion 204e continuous with the drain region 204c and a connection portion 210a of the pixel electrode 210. Namely, the transparent auxiliary capacitor electrode 204d is continuously formed over the pixel regions adjoining each other in the vertical and horizontal directions. This transparent auxiliary capacitor electrode 204d faces each pixel electrode 210 with both the interlayer insulating film 208 and the planarizing film 209 interposed therebetween, thereby forming an auxiliary capacitor at each sub-pixel. This transparent auxiliary capacitor electrode 204d is provided between the source line 202 and the pixel electrode 210, and thus serves as a transparent shield electrode.

The LCD device is formed by bonding such an array substrate as described above and a counter substrate in which, e.g., a black matrix in a grid pattern, a color filter layer, and a counter electrode are formed on a transparent substrate, with a spacer interposed therebetween, and enclosing a nematic liquid crystal material having electrooptical characteristics, etc. between the array substrate and the counter substrate.

(Manufacturing Method of LCD Device)

A manufacturing method of the array substrate of the LCD device described above will be described.

Figure 16:
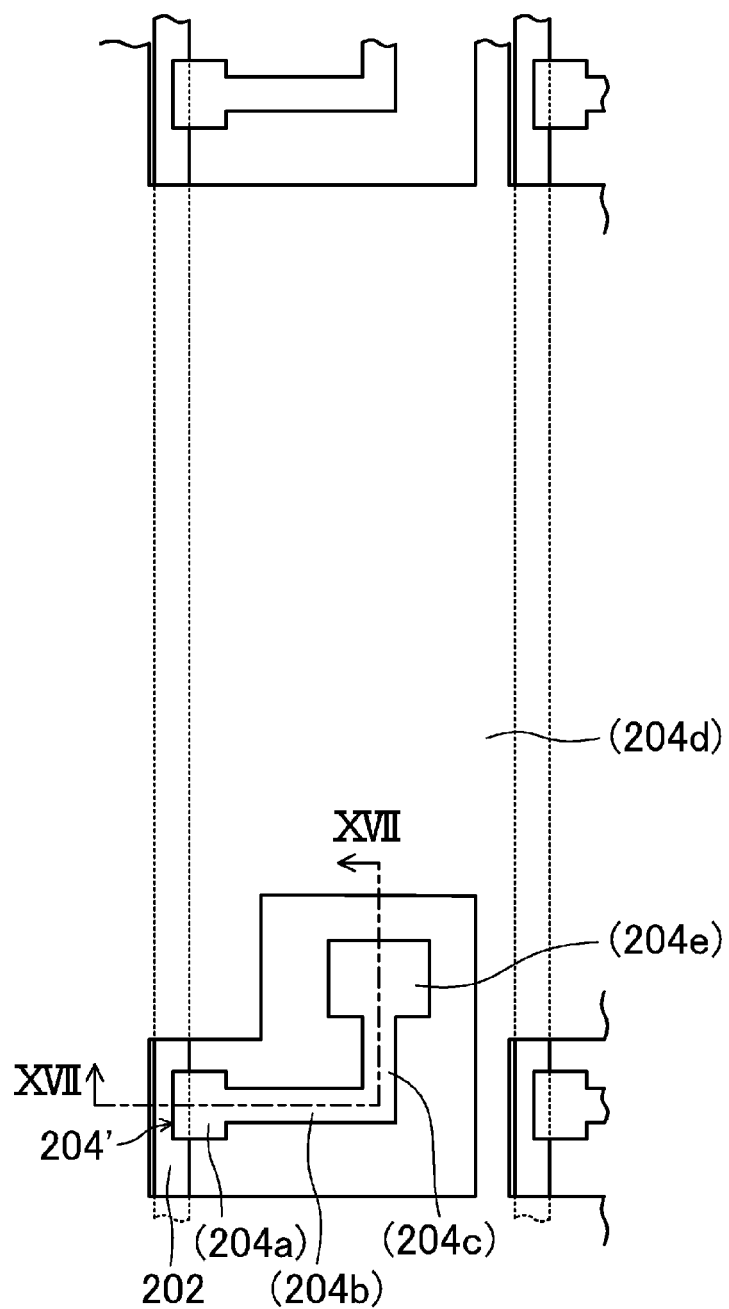
FIG. 16 is a plan view showing a first manufacturing step of the LCD device of the fourth embodiment.
Figure 17:
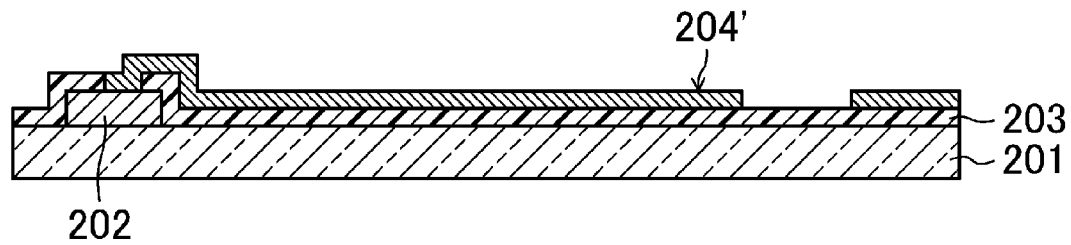
FIG. 17 is a sectional view taken alone line XVII-XVII in FIG. 16.

(1) (FIGS. 16 and 17) A conductive film is formed, and the source lines 202 are formed by photolithography. The insulating layer 203 is formed, and contact holes are formed at predetermined positions. Then, an oxide semiconductor layer 204' is formed and patterned.

Figure 18:
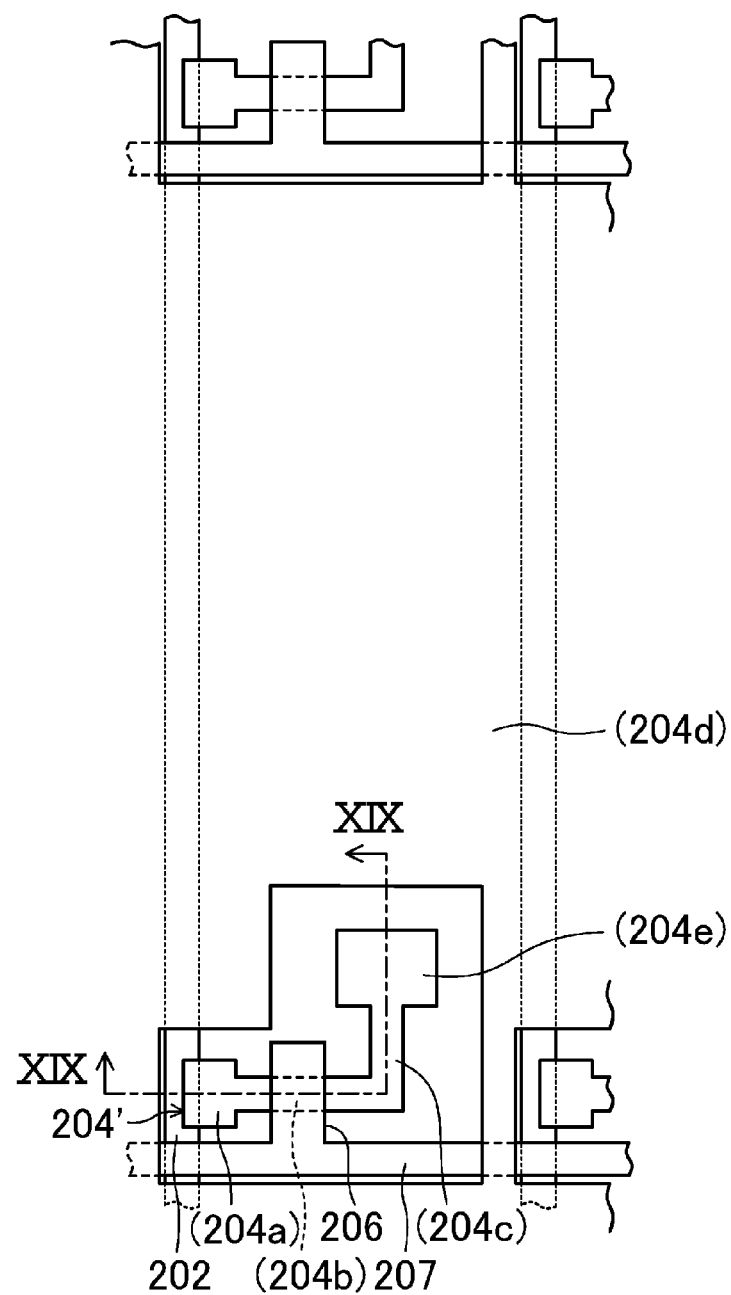
FIG. 18 is a plan view showing a second manufacturing step of the LCD device of the fourth embodiment.
Figure 19:
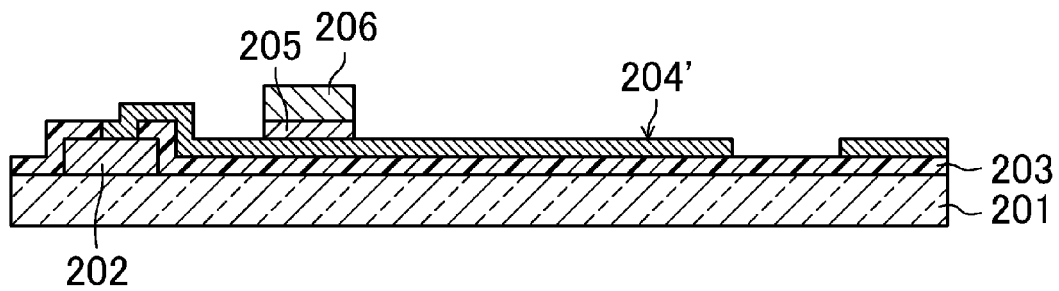
FIG. 19 is a sectional view taken along line XIX-XIX in FIG. 18.

(2) (FIGS. 18 and 19) An insulating film is formed, and then a conductive film is formed. The insulating film and the conductive film are patterned by photolithography (the gate insulating film 205, the gate electrodes 206, and the gate lines 207). At this time, the insulating film and the conductive film are etched at the same time.

(3) (FIGS. 20 and 21) The oxide semiconductor layer 204' other than a part masked by the gate electrode 206 (the channel region 204b) is lowered in resistance by exposure to reducing plasma (the source region 204a, the drain region 204c, the transparent auxiliary capacitor electrode 204d, and the connection portion 204e). More specifically, the formed oxide semiconductor layer 204 is lowered in resistance by exposure to plasma containing at least one of fluorine, hydrogen, and boron. For example, the upper surface of the substrate having the oxide semiconductor layer 204 formed thereon is exposed to a plasma atmosphere for a predetermined time by using a chemical vapor deposition (CVD) method, a doping method, etc., whereby the exposed part of the oxide semiconductor layer 204' is reformed and lowered in resistance.

Figure 22:
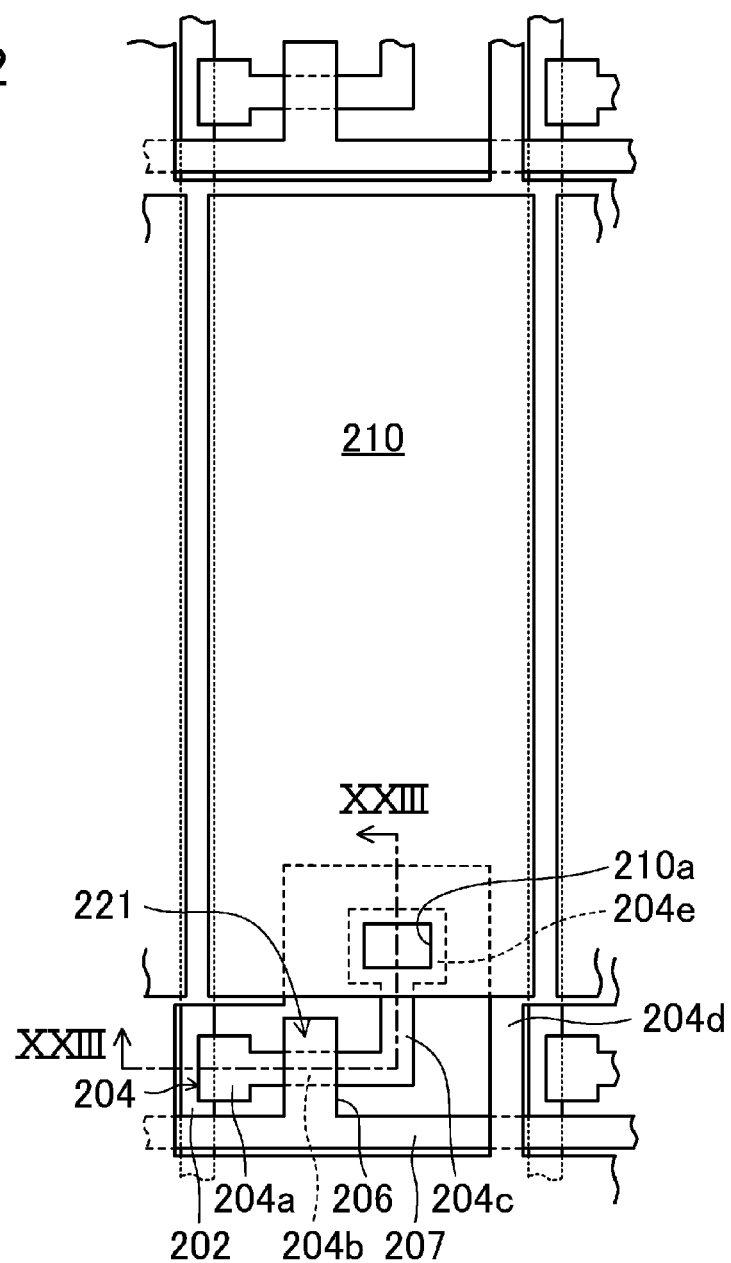
FIG. 22 is a plan view showing a fourth manufacturing step of the LCD device of the fourth embodiment.
Figure 23:
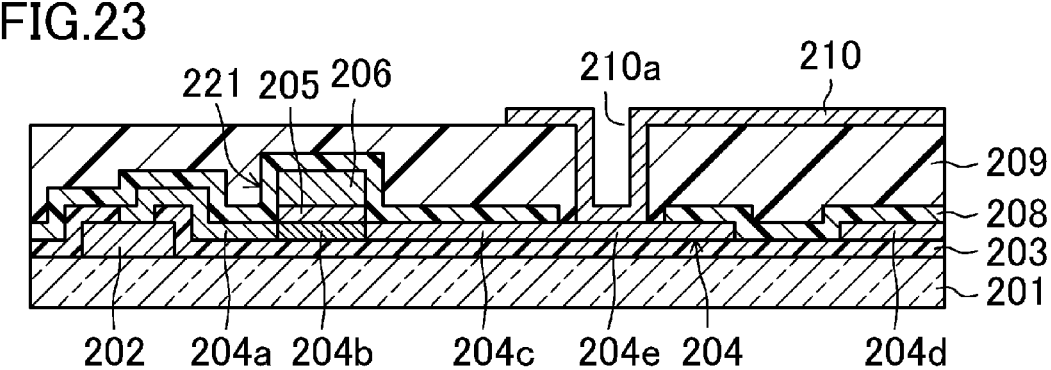
FIG. 23 is a sectional view taken along line XXIII-XXIII in FIG. 22.

(4) (FIGS. 22 and 23) The interlayer insulating film 208 and the planarizing film 209 are formed, contact holes are formed on the connection portions 204e of the switching elements 221, and the pixel electrodes 210 are formed.

Since the switching elements 221 and the transparent auxiliary capacitor electrode 204d as a transparent shield electrode can be formed at the same time as described above, the number of steps and the number of masks can be reduced, and the process flow can be reduced. That is, the first embodiment requires a total of eight masks in formation and processing of the gate lines, formation of the gate insulating film, formation and processing of the oxide semiconductor layer, formation and processing of the source lines, formation and processing of the protective insulating film, formation and processing of the planarizing film, formation and processing of the transparent auxiliary capacitor electrode (transparent shield electrode), formation and processing of the insulating film, and formation and processing of the pixel electrodes. However, the second embodiment requires a total of seven masks in formation and processing of the source lines, formation and processing of the insulating film, formation and processing of the oxide semiconductor layer, formation and processing of the gate insulating film and the gate lines, reduction in resistance of the oxide semiconductor layers, formation and processing of the protective insulating film, formation and processing of the planarizing film, and formation and processing of the pixel electrodes. Thus, the number of steps and the number of masks can be reduced, and accuracy can be improved to facilitate reduction in variation in characteristics, etc.

The above examples are described with respect to the case where the source line 105, 202 overlaps the pixel electrode 111, 210. However, even if the source line does not overlap the pixel electrode, parasitic capacitance produced near the source line and the pixel electrode can be suppressed. Accordingly, crosstalk can be reliably suppressed, and flicker can be reduced.

The components described in the above embodiments may be used in various combinations as long as logical inconsistency arises. Specifically, for example, the shape of the pixel electrode 111 or the transparent auxiliary capacitor electrode 109 described in the second and third embodiments may be applied to the LCD device of the fourth embodiment.

INDUSTRIAL APPLICABILITY

As described above, the present invention is useful for active matrix LCD devices.

DESCRIPTION OF REFERENCE CHARACTERS

101 Transparent Substrate
102 Gate Line
103 Gate Insulating Film
104 Oxide Semiconductor Layer
105 Source Line
105a Source Electrode
106 Drain Line
106a Drain Electrode
106b Connection Portion
107 Interlayer Insulating Film
108 Planarizing Film
109 Transparent Auxiliary Capacitor Electrode
109a Opening
110 Capacitor Insulating Film
111 Pixel Electrode
111a Connection Portion
111b Slit
121 Switching Element
201 Transparent Substrate
202 Source Line
203 Insulating Film
204 Oxide Semiconductor Layer
204' Oxide Semiconductor Layer
204a Source Region
204b Channel Region
204c Drain Region
204d Transparent Auxiliary Capacitor Electrode
204e Connection Portion
205 Gate Insulating Film
206 Gate Electrode
207 Gate Line
208 Interlayer Insulating Film
209 Planarizing Film
210 Pixel Electrode
210a Connection Portion
221 Switching Element

The invention claimed is:
1. An LCD device, comprising:
gate lines and source lines which are provided in a grid pattern;
pixel electrodes arranged in a matrix pattern so as to correspond to intersections of the gate lines and the source lines;
a transparent auxiliary capacitor electrode that forms auxiliary capacitance between the transparent auxiliary capacitor electrode itself and the pixel electrode; and switching elements configured to apply an image signal voltage supplied from the source line to the pixel electrode according to a scanning signal applied from the gate line, wherein the switching element is comprised of oxide semiconductor, the transparent auxiliary capacitor electrode is provided between the source line and the pixel electrode, and the transparent auxiliary capacitor electrode is comprised of oxide semiconductor having lowered resistance.

2. The LCD device of claim 1, wherein
the transparent auxiliary capacitor electrode is formed over an entire area of each pixel region except a region where the switching element is provided and a region where the switching element is connected to the pixel electrode.

3. The LCD device of claim 1, wherein
the transparent auxiliary capacitor electrode is continuously formed over the pixel regions adjoining each other in vertical and horizontal directions.

4. The LCD device of claim 1, wherein
the transparent auxiliary capacitor electrode is formed in a same layer as the oxide semiconductor forming the switching element.

5. The LCD device of claim 4, wherein
the switching element further has a gate insulating film and a gate electrode, and the oxide semiconductor, the gate insulating film, and the gate electrode which form the switching element are sequentially stacked on a substrate.

6. The LCD device of claim 5, wherein
the oxide semiconductor forming the transparent auxiliary capacitor electrode is formed by lowering resistance of a region that is not masked by the gate electrode of the switching element.

7. The LCD device of claim 1, wherein
a plurality of slits that are parallel to each other are formed in the pixel electrode.

8. The LCD device of claim 1, wherein
the pixel electrode is provided so that its edge overlaps the source line.

9. The LCD device of claim 1, wherein
the oxide semiconductor is IGZO.

10. A manufacturing method of an LCD device including gate lines and source lines which are provided in a grid pattern, pixel electrodes arranged in a matrix pattern so as to correspond to intersections of the gate lines and the source lines, an auxiliary capacitor electrode that forms auxiliary capacitance between the auxiliary capacitor electrode itself and the pixel electrode, and switching elements configured to apply an image signal voltage supplied from the source line to the pixel electrode according to a scanning signal applied from the gate line, the switching element being comprised of oxide semiconductor, and the auxiliary capacitor electrode being provided between the source line and the pixel electrode and comprised of oxide semiconductor having lowered resistance, comprising the steps of:

forming a conductor layer on a substrate and patterning the conductor layer into the source lines;

forming an oxide semiconductor layer over the source line and patterning the oxide semiconductor layer into regions serving as a source electrode, a drain electrode, and a channel region of the switching element and a region serving as the auxiliary capacitor electrode;

sequentially forming an insulating film layer and a conductor layer on the oxide semiconductor layer and patterning the insulating film layer and the conductor layer into a gate insulating film, the gate line, and a gate electrode;

lowering resistance of the oxide semiconductor layer by using the gate electrode as a mask to form the source electrode and the drain electrode of the switching element and the auxiliary capacitor electrode; and forming a conductor layer over the drain electrode of the switching element and the auxiliary capacitor electrode and patterning the conductor layer into the pixel electrode.

11. The manufacturing method of an LCD device of claim 10, wherein
the oxide semiconductor is IGZO.

\* \* \* \* \*